Patented June 12, 1923.

1,458,828

UNITED STATES PATENT OFFICE.

FRANK A. JOHNSON, OF NORFOLK, VIRGINIA.

ANTISLIP COMPOSITION.

No Drawing.   Application filed November 28, 1921.   Serial No. 518,255.

*To all whom it may concern:*

Be it known that I, FRANK A. JOHNSON, a citizen of the United States, residing at Norfolk, in the county of Norfolk and State of Virginia, have invented certain new and useful Improvements in Antislip Composition, of which the following is a specification.

This invention relates to pulley coverings and the object thereof is to provide a covering of this character which will effectively prevent slipping of the belt used in connection therewith avoiding the necessity of the belt being tight and thereby prolonging the life thereof.

Another object is to provide a covering for a pulley covered with a compound which will prevent the slipping of the belt used in connection with the pulley.

With these and other objects in view, the invention consists in certain novel features of construction as hereinafter described and claimed.

The pulley covering which constitutes this invention is composed of a piece of fabric impregnated and coated on its opposed faces with an anti-slipping composition, composed of the following ingredients to wit:

| | |
|---|---|
| Powdered aluminum ammonium sulphate (ammonium alum) | ½ oz. |
| Cane sugar | 1 oz. |
| Lamp black | 1 oz. |
| Sodium carbonate | 1 oz. |
| India gum | 4 oz. |
| Sheet isinglass | 1 oz. |
| Gelatine | 3 oz. |
| Flour | 4½ oz. |

The above mentioned ingredients are mixed with cold water to the consistency of liquid paint then boiled for ten minutes, and the fabric submerged until thoroughly saturated and after being thoroughly dried this treated fabric strip which has been shaped to conform to the pulley in connection with which it is to be used is applied to the perimeter of the pulley over which the belt is designed to travel and which will effectively prevent slipping of the belt thereby avoiding the necessity of the belt being tight which is necessary when no covering is provided for the pulley, and thus the life of the belt is prolonged.

The covering may be applied to the pulley in any suitable manner, the treated fabric covering is more or less rough and this roughness prevents slipping of the belt over the pulley.

It will be understood that any modifications within the scope of the claimed invention may be made without departing from the principle of the invention or sacrificing any of its advantages.

I claim:—

An anti-slipping covering for pulleys, composed of a piece of fabric treated with a compound formed of powered aluminum ammonium sulphate, cane sugar, lamp black, sodium carbonate, India gum, sheet isinglass, gelatine, and flour, in substantially the proportions stated.

In testimony whereof, I affix my signature hereto.

FRANK A. JOHNSON.